(12) United States Patent
Yoshimura et al.

(10) Patent No.: US 8,693,843 B2
(45) Date of Patent: Apr. 8, 2014

(54) INFORMATION PROCESSING APPARATUS, METHOD, AND PROGRAM

(75) Inventors: Shunji Yoshimura, Tokyo (JP); Noboru Murabayashi, Saitama (JP)

(73) Assignee: Sony Corporation, Tokyo (JP)

( * ) Notice: Subject to any disclaimer, the term of this patent is extended or adjusted under 35 U.S.C. 154(b) by 1021 days.

(21) Appl. No.: 12/104,025

(22) Filed: Apr. 16, 2008

(65) Prior Publication Data

US 2008/0285957 A1 Nov. 20, 2008

(30) Foreign Application Priority Data

May 15, 2007 (JP) ................................. 2007-129516
Sep. 28, 2007 (JP) ................................. 2007-254992

(51) Int. Cl.
*H04N 9/80* (2006.01)
(52) U.S. Cl.
USPC ....... 386/241; 386/239; 375/240.28; 725/135
(58) Field of Classification Search
USPC .......................................... 386/46, 239, 241
See application file for complete search history.

(56) References Cited

U.S. PATENT DOCUMENTS

| | | | | |
|---|---|---|---|---|
| 2002/0009284 A1* | 1/2002 | Murabayashi | .................. | 386/46 |
| 2002/0163532 A1* | 11/2002 | Thomas et al. | ................ | 345/723 |
| 2003/0123850 A1* | 7/2003 | Jun et al. | .......................... | 386/68 |
| 2004/0125877 A1* | 7/2004 | Chang et al. | ............. | 375/240.28 |
| 2004/0128317 A1* | 7/2004 | Sull et al. | ................... | 707/104.1 |
| 2005/0022252 A1* | 1/2005 | Shen | ............................. | 725/135 |

FOREIGN PATENT DOCUMENTS

| | | |
|---|---|---|
| JP | 2002-27411 | 1/2002 |
| JP | 2004-227423 | 8/2004 |
| JP | 2004-350092 | 12/2004 |
| JP | 2005-293339 | 10/2005 |
| JP | 2006-173766 | 6/2006 |
| JP | 2007-82088 A | 3/2007 |

* cited by examiner

*Primary Examiner* — Taghi Arani
*Assistant Examiner* — Syed Zaidi
(74) *Attorney, Agent, or Firm* — Oblon, Spivak, McClelland, Maier & Neustadt, L.L.P.

(57) ABSTRACT

An information processing apparatus includes: accepting means for accepting user's input of specification of a remarkable scene during playback processing of a video content to be recorded on a recording medium or a video content already recorded on a recording medium; setting means for setting a scene corresponding to a timing of accepting the input of specification by the accepting means to a user's remarkable scene; acquiring means for acquiring additional information for generating a display indicating the remarkable scene contents; and display controlling means for controlling generation of the display indicating the remarkable scene contents on the basis of the additional information and display of a list screen including an arrangement of the display indicating the remarkable scene contents for each remarkable scene.

12 Claims, 12 Drawing Sheets

FIG. 1

[PROFESSIONAL BASEBALL ○○ VERSUS △△]

[QUIZ XYZ]

[○× WORLD CUP]

TAKESAKA'S HOME RUN
[PROFESSIONAL BASEBALL ○○ VERSUS △△]

TAKESAKA'S STRIKEOUT
[PROFESSIONAL BASEBALL ○○ VERSUS △△]

CHALLENGES FINAL QUESTION
OF ONE MILLION YEN
[QUIZ XYZ]

GOAL OF PLAYER ODA
[JAPAN] VERSUS [ECUADOR]

UENO GAVE UP A HOME RUN
[PROFESSIONAL BASEBALL ○○ VERSUS △△]

TAKESAKA'S STRIKEOUT
[PROFESSIONAL BASEBALL ○○ VERSUS △△]

CHALLENGES FINAL QUESTION
OF ONE MILLION YEN
[QUIZ XYZ]

GOAL OF PLAYER ODA
[JAPAN] VERSUS [ECUADOR]

FIG. 12

INFORMATION PROCESSING APPARATUS, METHOD, AND PROGRAM

CROSS REFERENCES TO RELATED APPLICATIONS

The present invention contains subject matter related to Japanese Patent Application JP 2007-254992 filed in the Japanese Patent Office on Sep. 28, 2007, the entire contents of which are incorporated herein by reference.

BACKGROUND OF THE INVENTION

1. Field of the Invention

The present invention relates to an information processing apparatus, method, and program, and more particularly to an information processing apparatus, method, and program which allow a user to easily find a scene to be viewed in a recorded content.

2. Description of the Related Art

Figure 1:
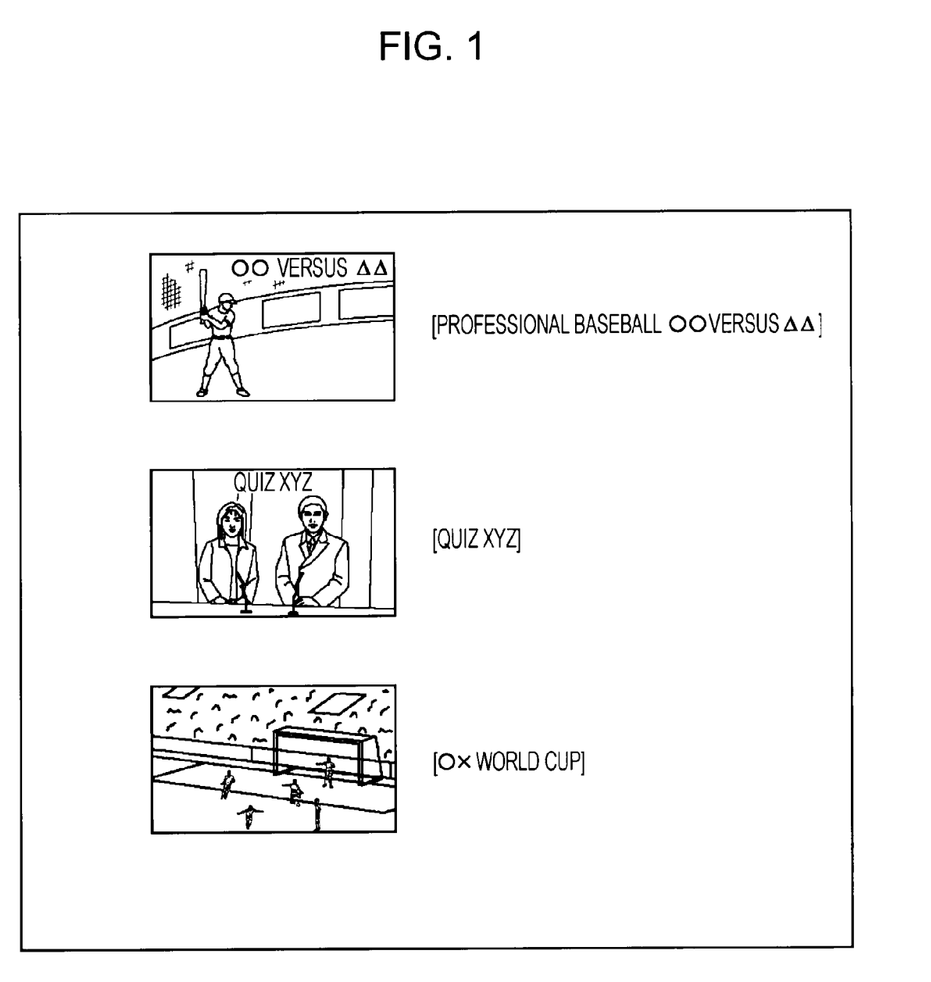
FIG. 1 is a diagram illustrating an example of a display of a related-art menu screen.

FIG. 1 illustrates an example of a recorded program list (in the following, called a menu screen) displayed by a recording and playback apparatus in which a television broadcasting program is recorded.

In the example of FIG. 1, thumbnail images and titles of individual recorded programs are displayed. These thumbnail images are generated, for example, from image data of programs taken in at the time of the start of recording. If recording is started from the start of the broadcasting of a program, the thumbnail image is produced by a thumbnail of an initial image of the program. The display of the title is generated, for example, by title information extracted from EPG (Electronic Program Guide) information.

When a thumbnail image or a title display corresponding to a predetermined program of a menu screen is selected by a user's operation on a remote controller, etc., for specifying a program to be viewed, the data of the specified program is read out from a recording medium to be played back.

In this manner, the user is allowed to find a program to be viewed from the menu screen, and to view the program.

There are various kinds of methods for displaying a list of recorded programs. For example, programs are classified on the basis of validated dates of the programs set in the programs to be reserved for recording, and a list of recording programs is displayed for each classified program. In this method, a display unit is based on a program (Japanese Unexamined Patent Application Publication No. 2006-173766).

SUMMARY OF THE INVENTION

Incidentally, as described above, in this menu screen, thumbnail images and title displays are arranged for each program (in the example in FIG. 1, a baseball program, a quiz program, and a soccer program), and are constituted for each program. Accordingly, the user is allowed to specify a program to be viewed only for each program.

However, when the user is allowed to specify a program to be viewed only for each program, if the user wants to view a certain scene of a program (for example, if the user wants to view a scene of a certain player hitting a home run, which has been broadcast in a baseball program), it has been necessary for the user to select the program display from a menu screen first to play back the program, and then to view the program until that scene.

That is to say, in a related-art menu screen of a recording program, etc., the user has not been allowed to easily find a scene to be viewed from the program.

The present invention addresses the above identified and other problems. It is desirable to allow the user to easily find a scene to be viewed in a recorded content.

According to an embodiment of the present invention, there is provided an information processing apparatus including: accepting means for accepting user's input of specification of a remarkable scene during playback processing of a video content to be recorded on a recording medium or a video content already recorded on a recording medium; setting means for setting a scene corresponding to a timing of accepting the input of specification by the accepting means to a user's remarkable scene; acquiring means for acquiring additional information for generating a display indicating the remarkable scene contents; and display controlling means for controlling generation of the display indicating the remarkable scene contents on the basis of the additional information and display of a list screen including an arrangement of the display indicating the remarkable scene contents for each remarkable scene.

In the embodiment of the present invention, the acquiring means may include detecting means for detecting a scene change of the video content to be recorded on a recording medium or a video content already recorded on a recording medium, and the setting means may set a scene starting from a scene change having been detected by the detecting means immediately before the timing of accepting the input of specification by the accepting means to the remarkable scene.

In the embodiment of the present invention, the acquiring means may include extracting means for extracting character information on the basis of an image feature amount of the remarkable scene, and the display controlling means may control generation of the list screen using a display of the character information extracted by the extracting means as a display indicating the remarkable scene contents, and display of the list screen.

In the embodiment of the present invention, when character information is multiplexed with the video content, the acquiring means may include extracting means for extracting the character information superimposed in the vicinity of the remarkable scene, and the display controlling means may control generation of the list screen using a display of the character information extracted by the extracting means as a display indicating the remarkable scene contents, and display of the list screen.

According to an embodiment of the present invention, there is provided a method of processing information or program, including the steps of: accepting user's input of specification of a remarkable scene during playback processing of a video content to be recorded on a recording medium or a video content already recorded on a recording medium; setting a scene corresponding to a timing of accepting the input of specification by the step of accepting to a user's remarkable scene; acquiring additional information for generating a display indicating the remarkable scene contents; and display controlling for generating the display indicating the remarkable scene contents on the basis of the additional information and displaying a list screen including an arrangement of the display indicating the remarkable scene contents for each remarkable scene.

In a method of processing information or program according to an embodiment of the present invention, user's input of specification of a remarkable scene is accepted during playback processing of a video content to be recorded on a recording medium or a video content already recorded on a recording medium, a scene corresponding to a timing of accepting the input of specification is set to a user's remarkable scene, additional information for generating a display indicating the remarkable scene contents is acquired, and display control is performed on generation of the display indicating the remarkable scene contents on the basis of the additional information and displaying a list screen including an arrangement of the display indicating the remarkable scene contents for each remarkable scene.

By an embodiment of the present invention, it is possible for a user to easily find a scene to be viewed in a recorded content.

DESCRIPTION OF THE PREFERRED EMBODIMENTS

In the following, a description will be given of embodiments of the present invention. The relationship between the constituent features of the present invention and the embodiment described in this specification or the drawings is exemplified as follows. This description is for confirming that an embodiment supporting the present invention is included in the specification or the drawings. Accordingly, if there is an embodiment included in the specification or the drawings, but not included here as an embodiment corresponding to the constituent features of the present invention, the fact does not mean that the embodiment does not correspond to the constituent features of the invention. On the contrary, if an embodiment is included here as constituent features corresponding to the present invention, the fact does not mean the embodiment does not correspond to the constituent features other than that constituent feature.

Figure 2:
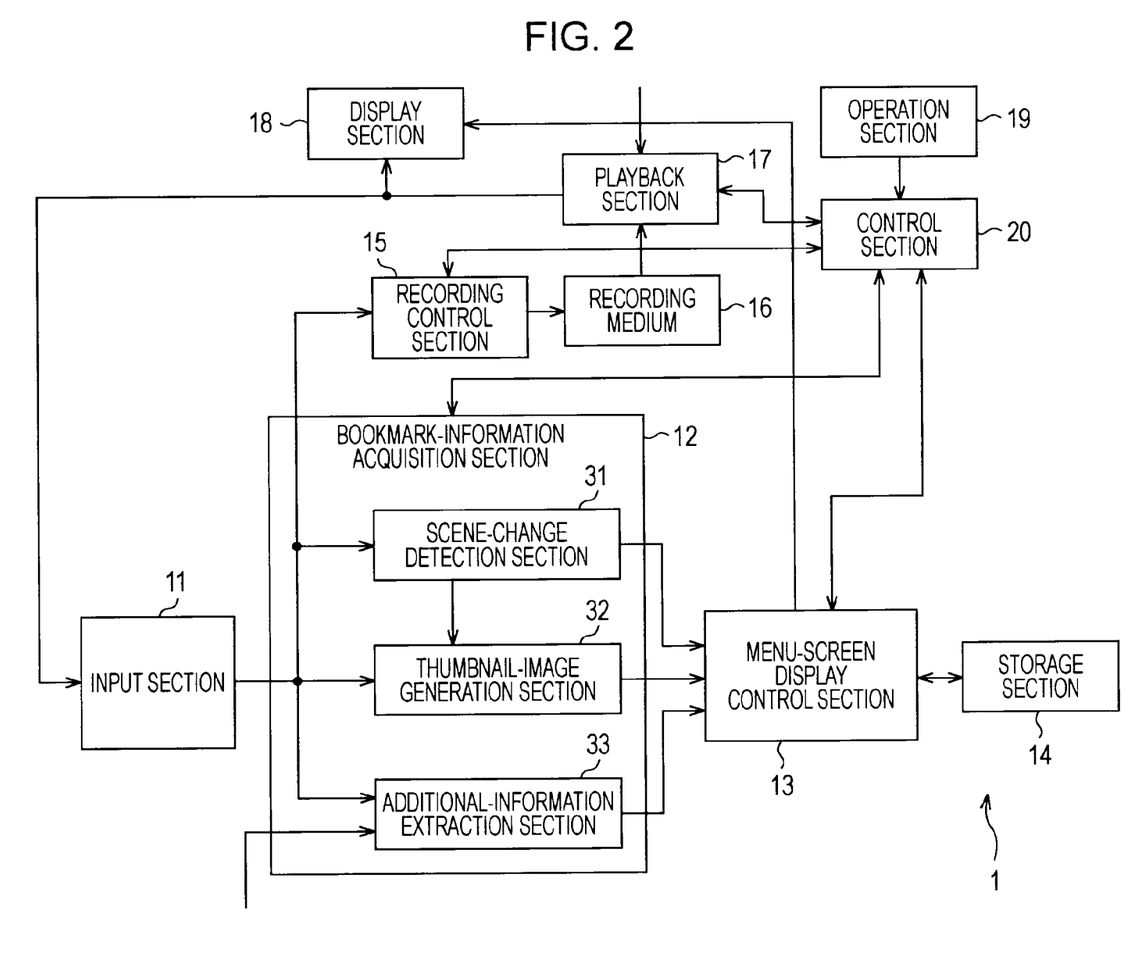
FIG. 2 is a block diagram illustrating an example of a configuration of a recording and playback apparatus 1 to which the present invention is applied.

According to an embodiment of the present invention, there is provided an information processing apparatus including: accepting means (for example, a control section 20 in FIG. 2) for accepting user's input of specification of a remarkable scene during playback processing of a video content to be recorded on a recording medium or a video content already recorded on a recording medium; setting means (for example, a menu-screen display control section 13 in FIG. 2) for setting a scene corresponding to a timing of accepting the input of specification by the accepting means to a user's remarkable scene; acquiring means (for example, a bookmark-information acquisition section 12 and the menu-screen display control section 13 in FIG. 2) for acquiring additional information for generating a display indicating the remarkable scene contents; and display controlling means (for example, the menu-screen display control section 13 in FIG. 2) for controlling generation of the display indicating the remarkable scene contents on the basis of the additional information and display of a list screen including an arrangement of the display indicating the remarkable scene contents for each remarkable scene.

In the embodiment of the present invention, the acquiring means may include detecting means (for example, a scene-change detection section 31 in FIG. 2) for detecting a scene change of the video content to be recorded on a recording medium or a video content already recorded on a recording medium, and the setting means may set a scene starting from a scene change having been detected by the detecting means immediately before the timing of accepting the input of specification by the accepting means to the remarkable scene.

In the embodiment of the present invention, the acquiring means may include extracting means (for example, an additional-information extraction section 33 in FIG. 2) for extracting character information on the basis of an image feature amount of the remarkable scene, and the display controlling means may control generation of the list screen using a display of the character information extracted by the extracting means as a display indicating the remarkable scene contents, and display of the list screen.

In the embodiment of the present invention, when the character information is multiplexed with the video content, the acquiring means may include extracting means (for example, the additional-information extraction section 33 in FIG. 2) for extracting the character information superimposed in the vicinity of the remarkable scene, and the display controlling means may control generation of the list screen using a display of the character information extracted by the extracting means as a display indicating the remarkable scene contents, and display of the list screen.

Figure 7:
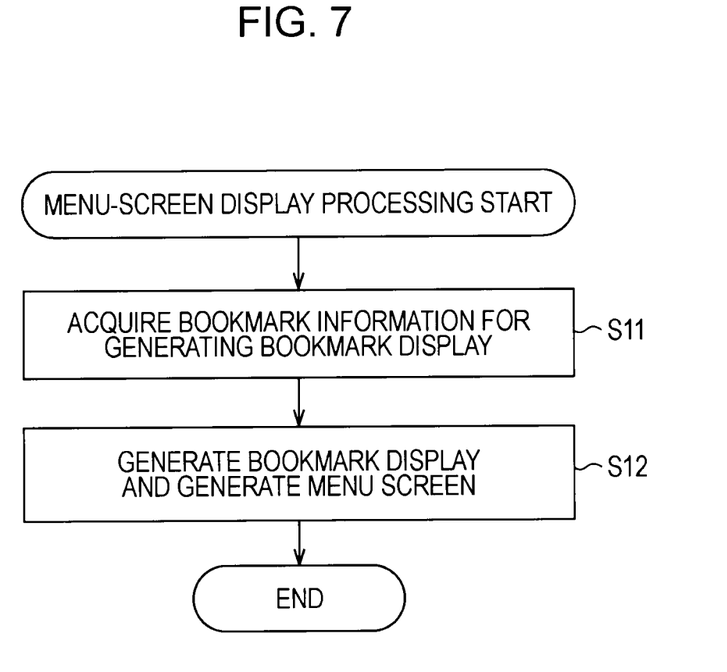
FIG. 7 is a flowchart illustrating menu-screen display processing.

According to an embodiment of the present invention, there is provided a method of processing information or program, including the steps of: accepting user's input of specification of a remarkable scene during playback processing of a video content to be recorded on a recording medium or a video content already recorded on a recording medium (for example, step S3 in FIG. 5); setting a scene corresponding to a timing of accepting the input of specification by the step of accepting to a user's remarkable scene (for example, step S4 in FIG. 5); acquiring additional information for generating a display indicating the remarkable scene contents (for example, step S5 in FIG. 5); and display controlling for generating the display indicating the remarkable scene contents on the basis of the additional information and displaying a list screen including an arrangement of the display indicating the remarkable scene contents for each remarkable scene (for example, step S11 and step S12 in FIG. 7).

FIG. 2 illustrates an example of a configuration of a recording and playback apparatus 1 to which the present invention is applied. The recording and playback apparatus 1 accepts user's operation (in the following, called a bookmark operation) of specifying a remarkable scene during playback processing of a video content to be recorded on a recording medium or a video content already recorded on a recording medium, and generates a thumbnail image and a comment (in the following, called a bookmark display) indicating the scene to which a bookmark has been added on the basis of predetermined information of a remarkable scene (in the following, called a scene to which a bookmark has been added) corresponding to a timing of the bookmark operation. For example, as shown in FIG. 3, a list screen (that is to say, a menu screen) of the recorded program, on which bookmark displays are disposed for individual scenes to which bookmarks have been added, is displayed.

Figure 3:
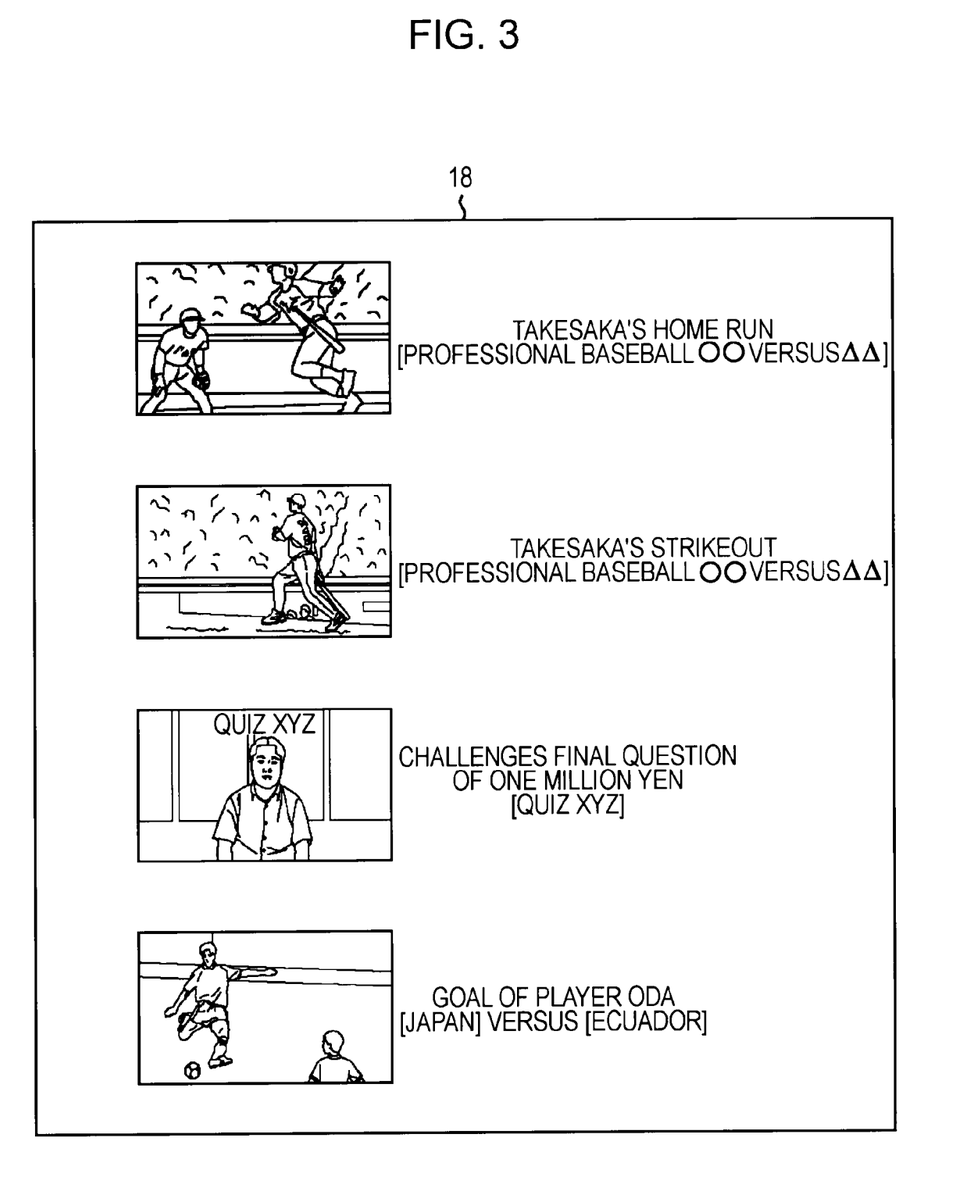
FIG. 3 is a diagram illustrating an example of a display of a menu screen of the recording and playback apparatus 1 of FIG. 2.

In the example of FIG. 3, the following are displayed for each scene. First, a thumbnail image of a scene when a predetermined player, "Takesaka" hit a home run, which was specified by a bookmark operation during viewing a baseball program, a comment (Takesaka's home run) generated from predetermined information of the scene, and a title of the baseball program (written in square brackets in the figure) are displayed. Second, a thumbnail image of a scene when a predetermined player, "Takesaka" got struck out, which was specified by a bookmark operation during viewing a baseball program, a comment (Takesaka's strikeout) generated from predetermined information of the scene, and a title of the baseball program are displayed. Third, a thumbnail image of a scene when an answerer is challenging a final question, which was specified by a bookmark operation during viewing a quiz program, a comment (challenges a final question of one million yen) generated from predetermined information of the scene, and a title of the quiz program are displayed. Finally, a thumbnail image of a scene when a predetermined player "Oda" won a goal, which was specified by a bookmark operation during viewing a soccer program, a comment (a goal by player, Oda) generated from predetermined information of the scene, and a title of the soccer program are displayed.

When such a menu screen including a bookmark display for each scene to which a bookmark has been added is operated, and a predetermined bookmark display is specified, the recording and playback apparatus 1 starts the playback of the program from the specified scene, for example.

In this regard, here, a description will be given by taking, as an example, the case where a bookmark is added to a television broadcasting program to be recorded or that was already recorded. However, in the same manner, the present invention can be applied to another content including image data.

Referring back to FIG. 2, the image data of a program being recorded or image data of a program already recorded in a recording medium 16, which is being played back by a playback section 17 is input into an input section 11, and then is supplied to the bookmark-information acquisition section 12 and a recording control section 15.

The bookmark-information acquisition section 12 acquires information (in the following, called bookmark information) necessary for generating a bookmark display from the image data, etc., supplied from the input section 11 under the control of a control section 20, and supplies it to the menu-screen display control section 13.

The menu-screen display control section 13 extracts bookmark information for generating a menu screen from the bookmark information supplied from the bookmark-information acquisition section 12 under the control of the control section 20, and stores it into a storage section 14.

Also, under the control of the control section 20, the menu-screen display control section 13 generates a bookmark display from the bookmark information stored in the storage section 14, and generates a menu screen by disposing the generated bookmark display for each scene to which a bookmark has been added as shown in FIG. 3, and displays the menu screen on the display section 18.

The recording control section 15 records the image data supplied from the input section 11 onto the recording medium 16 under the control of the control section 20.

The playback section 17 plays back the image data input separately or the image data recorded on the recording medium 16 under the control of the control section 20, and supplies the image data to the display section 18 and the input section 11.

An operation section 19 includes a receiving section receiving control signals from various buttons and a remote controller, and the like. The operation section 19 receives input of user's operation contents on the various buttons, etc., and informs the control section 20 of the contents.

The control section 20 controls each section, and performs bookmark processing described below, and the like.

Next, a description will be given of an example of a configuration of the bookmark-information acquisition section 12.

A scene-change detection section 31 analyzes the image data supplied from the input section 11, and detects a scene change. For example, a point of change from a main part of a program to a commercial, a point of change from a night scene to a daytime scene, or a point of change in appearing persons and objects is detected as a scene change.

When the scene-change detection section 31 has detected a scene change, the scene-change detection section 31 supplies that information to a thumbnail-image generation section 32 and the menu-screen display control section 13.

For example, when the thumbnail-image generation section 32 is informed that a scene change has been detected from the scene-change detection section 31, the thumbnail-image generation section 32 generates a thumbnail image from the image data having a scene change, and supplies the thumbnail image to the menu-screen display control section 13.

Figure 4:
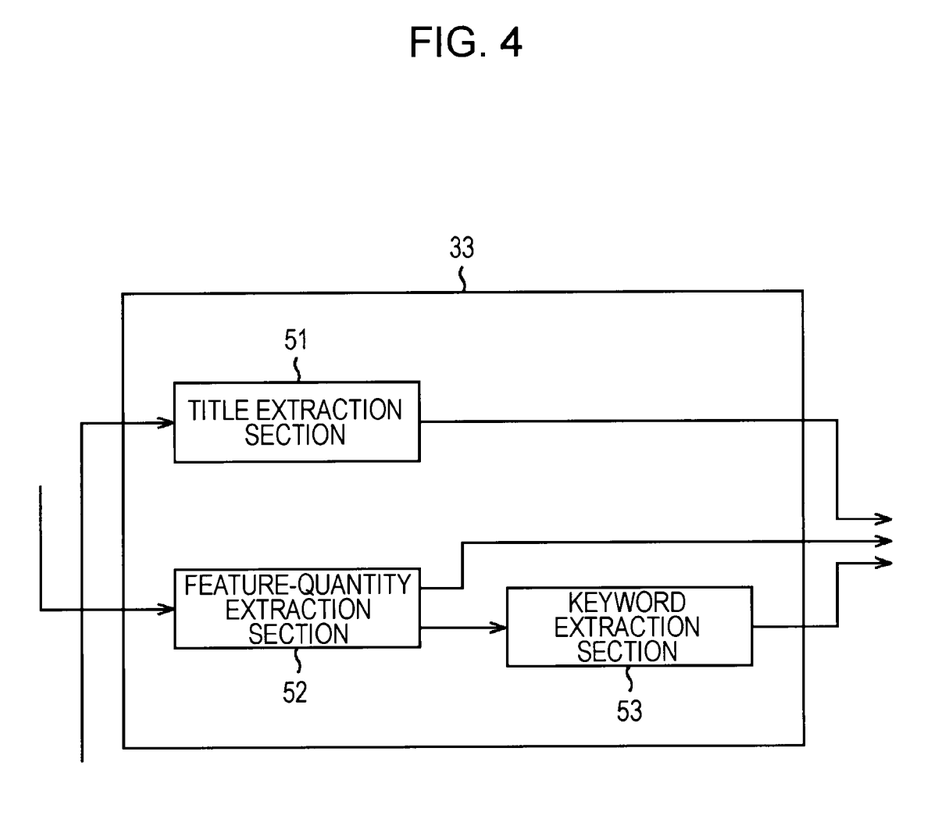
FIG. 4 is a block diagram illustrating an example of a configuration of an additional-information extraction section 33 in FIG. 2.

An additional-information extraction section 33 separately receives input of the image data from the input section 11 and EPG information. The additional-information extraction section 33 has a configuration as shown in FIG. 4. A title extraction section 51 extracts title information of a program from the input EPG information, and supplies the information to the menu-screen display control section 13.

A feature-quantity extraction section 52 extracts a predetermined feature quantity of the input image data, and supplies the extracted feature quantity to a keyword extraction section 53 and the menu-screen display control section 13.

The keyword extraction section 53 extracts a keyword from the feature quantity supplied from the feature-quantity extraction section 52, and supplies the keyword to the menu-screen display control section 13.

For example, if the image supplied to the additional-information extraction section 33 is multiplexed with character information of closed captioning, the feature quantity corresponding to the character information is supplied from the feature-quantity extraction section 52. Thus, the keyword extraction section 53 generates character information (that is to say, a text) corresponding to the feature quantity, and supplies the information to the menu-screen display control section 13.

Also, although character information is not included, if an image of a predetermined object, such as a "mountain", a "castle", etc., for example, is included, the feature quantities corresponding to such images are supplied from the feature-quantity extraction section 52, and thus the keyword extraction section 53 extracts a keyword corresponding to the feature quantity (for example, the word, such as a "mountain" or a "castle", or the name of a "mountain" or a "castle" if that name is identified), and supplies it to the menu-screen display control section 13.

Figure 5:
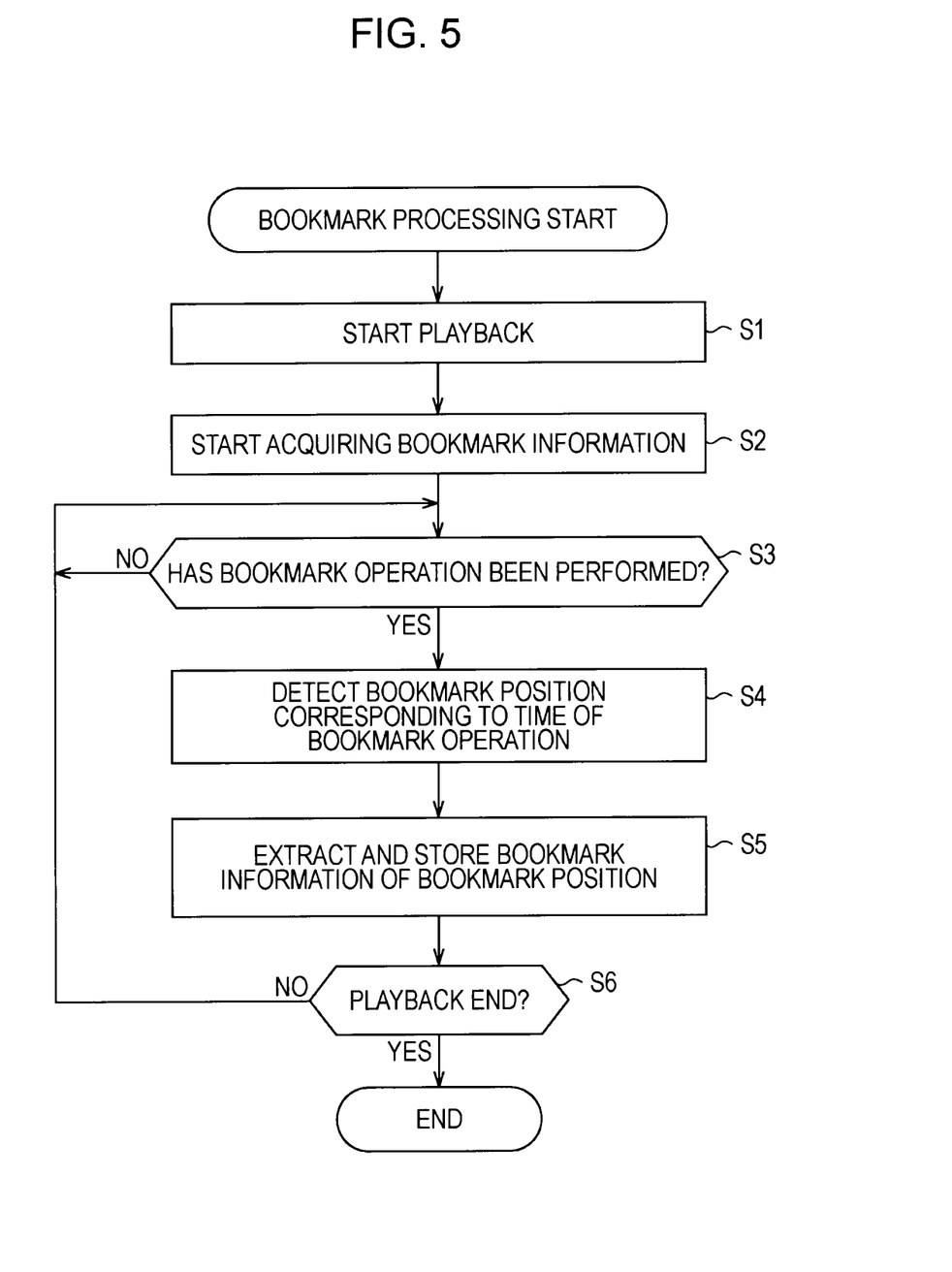
FIG. 5 is a flowchart illustrating bookmark processing.

Next, a description will be given of the bookmark processing of the recording and playback apparatus 1 with reference to the flowchart of FIG. 5.

In step S1, the control section 20 of the recording and playback apparatus 1 controls the playback section 17 to play back the image data input separately or the image data already recorded on the recording medium 16.

Thus, the image data played back by the playback section 17 is displayed on the display section 18 and is input into the input section 11. The input section 11 supplies the input image data to the recording control section 15 and the bookmark-information acquisition section 12. In this regard, when the image data recorded on the recording medium 16 is played back, the input section 11 does not supply image data to the recording control section 15.

Next, in step S2, the control section 20 controls the bookmark-information acquisition section 12 to start the acquisition of bookmark information.

Thus, the bookmark-information acquisition section 12 starts the acquisition of bookmark information from the image data, etc., supplied from the input section 11.

That is to say, the scene-change detection section 31 starts detecting a scene change. The thumbnail-image generation section 32 starts generating a thumbnail image. The additional-information extraction section 33 starts extracting additional information.

In step S3, the control section 20 waits until there is input of a bookmark operation for adding a bookmark to an image being played back from the operation section 19. If it is determined that there is input of that operation, in step S4, the control section 20 instructs the menu-screen display control section 13 to acquire bookmark information for generating a menu screen. Thus, the menu-screen display control section 13, for example, acquires a scene change position detected immediately before the scene when a bookmark operation has been performed, and detects the position of the image having a scene change as an image to which a bookmark is added.

Figure 6:
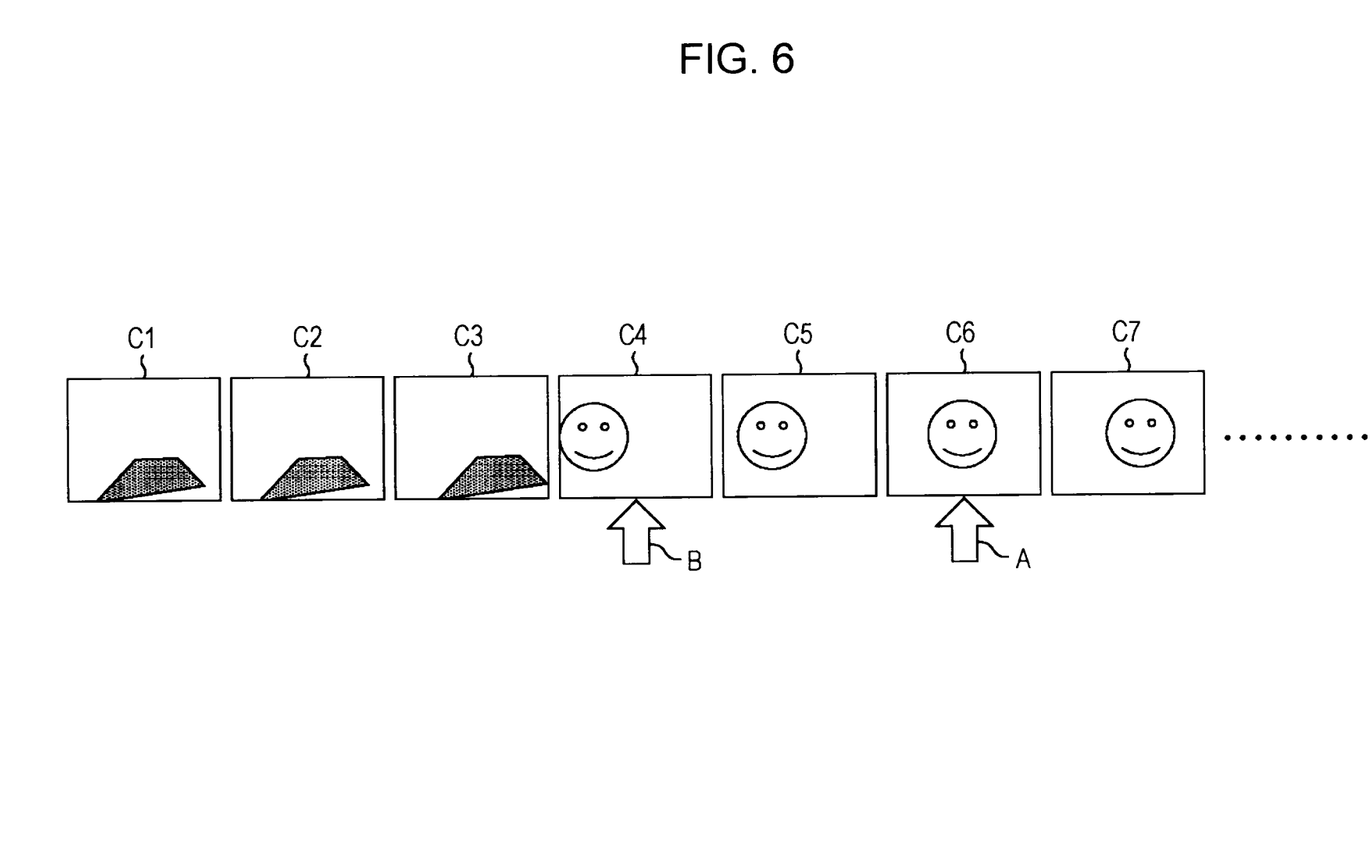
FIG. 6 is a diagram illustrating detection processing of a bookmark position.

For example, when scenes shown in FIG. 6 are played back in sequence from a scene C1 on the left side in the figure, and are displayed on the display section 18, if a bookmark operation is performed at the time when a scene C6 indicated by an up-arrow A is displayed, a bookmark is added to a scene C4, indicated by an up-arrow B, when a scene change, which has occurred from an image of a mountain scene to an image of a human face, is detected by the scene-change detection section 31.

Next, in step S5, the menu-screen display control section 13 extracts the thumbnail image and the additional information acquired from the image to which a bookmark is added (in the example in FIG. 6, the frame C4) from the thumbnail image and the additional information supplied from the bookmark-information acquisition section 12 (the thumbnail-image generation section 32 and the additional-information extraction section 33 thereof), and stores them into the storage section 14 as bookmark information for generating a menu screen.

When character information of closed captioning is mutiplexed with a video content to which a bookmark is added, the character information (that is to say, a text) extracted from that character image, supplied from the bookmark-information acquisition section 12, is stored in the storage section 14.

Also, although character information is not included, if an image of an object, such as a "mountain", a "castle", or the like, for example, is included, the word (for example, the word "mountain" or "castle") meaning that object, or the name of that object, etc., which have been extracted from that image and supplied from the bookmark-information acquisition section 12 is stored in the storage section 14.

Next, in step S6, the control section 20 determines whether an instruction of terminating the playback of the image data has been input from the operation section 19. If it is determined that the instruction has not been input, the processing returns to step S3, and the control section 20 waits until a bookmark operation is performed again.

In step S6, when an instruction of terminating the playback of the image data has been input, the control section 20 terminates the bookmark processing.

Next, a description will be given of display processing of a menu screen with reference to a flowchart in FIG. 7.

When the menu-screen display control section 13 accepts an instruction of displaying a menu screen from the control section 20, in step S11, the menu-screen display control section 13 reads out the bookmark information for generating the menu screen stored in the bookmark processing from the storage section 14.

In step S12, the menu-screen display control section 13 generates a bookmark display from the bookmark information read out in step S11. For example, if character information is stored as bookmark information, the menu-screen display control section 13 extracts predetermined words (for example, "Takesaka's home run", etc., in the example in FIG. 3) from the character information, and generates data for displaying a thumbnail image and a title.

The menu-screen display control section 13 disposes the generated bookmark display to be displayed for each scene with a bookmark as shown in FIG. 3 to generate a menu screen, and displays the menu screen on the display section 18.

In this manner, a menu screen on which a bookmark display is shown for each scene with a bookmark is presented to the user.

As described above, the user's bookmark operation on a scene being played back is accepted during playback processing of image data to be recorded on the recording medium 16 or the image data already recorded on the recording medium 16. A bookmark is added to the scene corresponding to the timing of the operation, a bookmark display is generated on the basis of the additional information obtained from the scene, and a menu screen on which the bookmark display is disposed for each scene with the bookmark is displayed. Thus, the user can easily find a scene to be viewed from the menu screen.

Also, even if the timing of the bookmark operation is delayed, a bookmark is added by going back to the scene at which a scene change occurred immediately before, and thus it is possible to appropriately add a bookmark. In the example of FIG. 6, it is possible to add a bookmark to the scene C4 at which an image of a human face began to be displayed.

Also, when character information of closed captioning is mutiplexed with a scene to which a bookmark is added, the character information can be displayed as a bookmark display. Since a character string of closed captioning describes the contents of the scene, a comment ("Takesaka's home run", etc., in the example in FIG. 3) expressing the scene appropriately can be used as a bookmark display.

In this regard, when a predetermined bookmark display on the menu screen shown in FIG. 3 is selected by the user's operation of the operation section 19, the playback of the scene corresponding to the bookmark display is started. For example, it is also possible to hold a scene-change point after the scene to which a bookmark is added, to perform the playback to that scene-change point, and to stop the playback thereafter.

Figure 8:
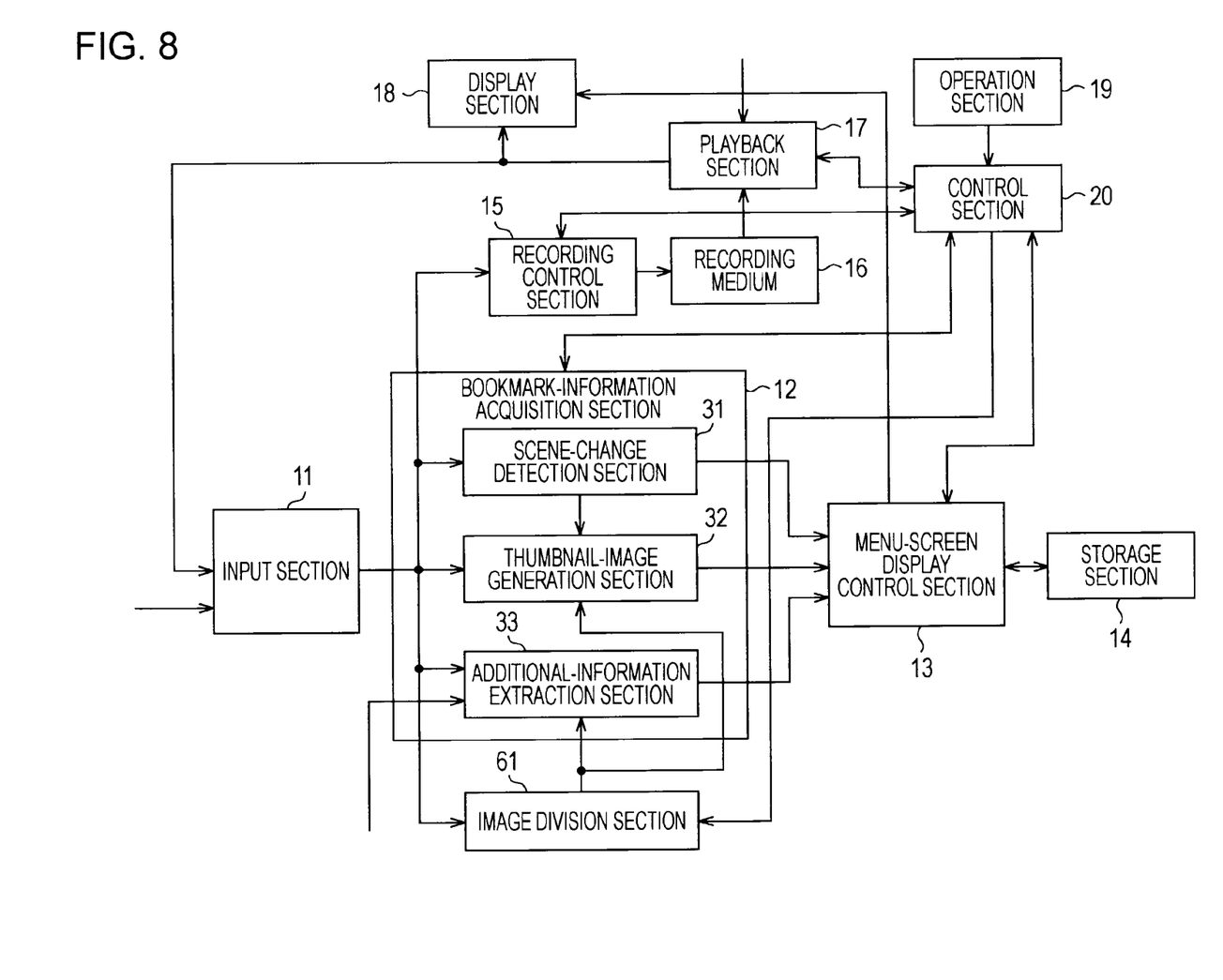
FIG. 8 is a block diagram illustrating another example of a configuration of a recording and playback apparatus 1 to which the present invention is applied.

FIG. 8 illustrates another example of a configuration of the recording and playback apparatus 1. The recording and playback apparatus is further provided with an image division section 61 in addition to the recording and playback apparatus 1 of FIG. 2.

Figure 9:
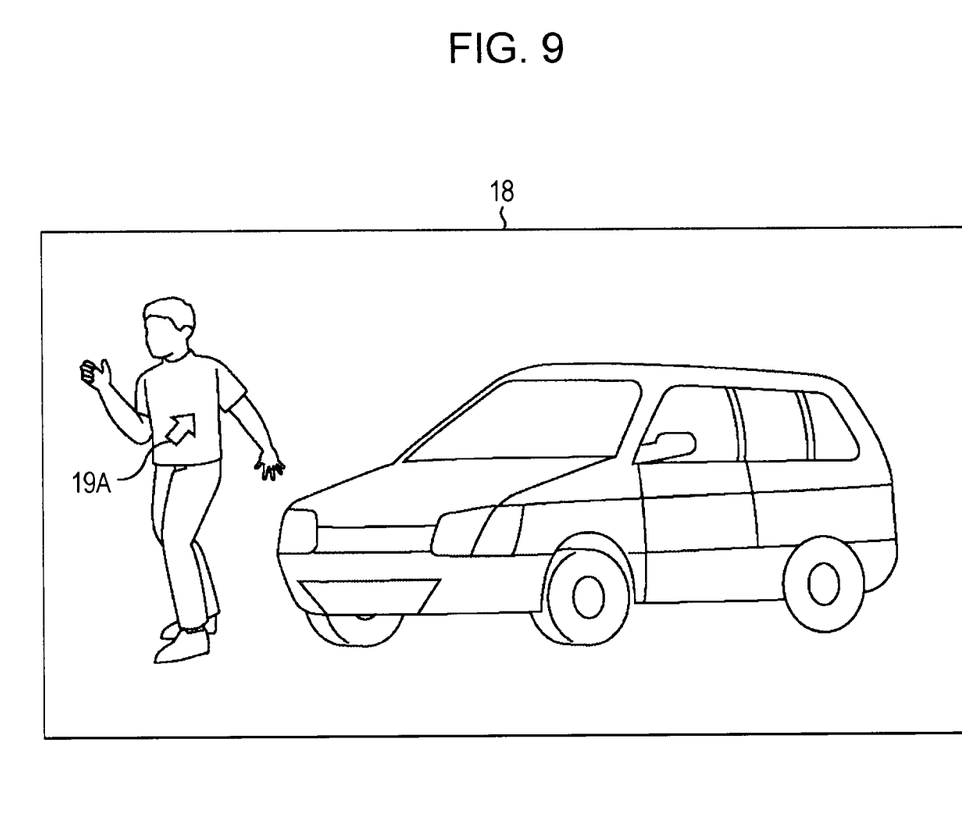
FIG. 9 is a diagram illustrating image division processing of the recording and playback apparatus 1 of FIG. 8.

As shown in FIG. 9, in the recording and playback apparatus 1 of FIG. 8, when an arbitrary position in a scene being played back is specified by the user's predetermined operation on the operation section 19 using a pointer 19A, additional information is extracted from the image data of the area corresponding to that position.

That is to say, if the control section 20 receives input of the specification of a predetermined position by the pointer 19A from the operation section 19, the control section 20 informs the image division section 61 of that position.

The image division section 61 extracts the image data of the area (the area of an image of a person in the example of FIG. 9) corresponding to the position informed from the control section 20 from the image data supplied from the input section 11, and supplies the image data to the thumbnail-image generation section 32 and the additional-information extraction section 33.

The thumbnail-image generation section 32 generates a thumbnail image from the divided image supplied from the image division section 61, and supplies the thumbnail image to the menu-screen display control section 13.

The additional-information extraction section 33 extracts additional information from the feature quantity of the divided image supplied from the image division section 61, and supplies the additional information to the menu-screen display control section 13. In the example of FIG. 9, the additional-information extraction section 33 recognizes that the image is an image of a person from the image data supplied from the image division section 61, and informs the menu-screen display control section 13 that the image is of a person. Also, the image data of a person supplied from the image division section 61 is subjected to face recognition, and if the name, etc., of the recognized person can be identified, the identified name, etc., can be informed to the menu-screen display control section 13.

The menu-screen display control section 13 stores the thumbnail image supplied from the thumbnail-image generation section 32 and the additional information supplied from additional-information extraction section 33 into the storage section 14 as bookmark information for generating a menu screen.

Figure 10:
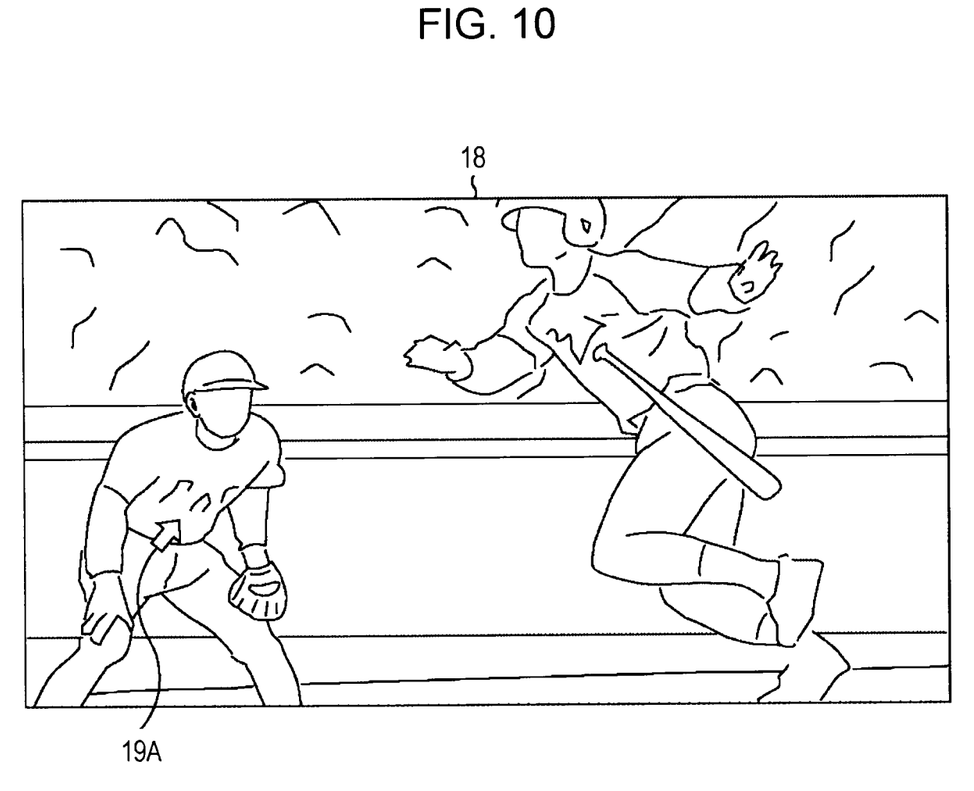
FIG. 10 is another diagram illustrating image division processing of the recording and playback apparatus 1 of FIG. 8.
Figure 11:
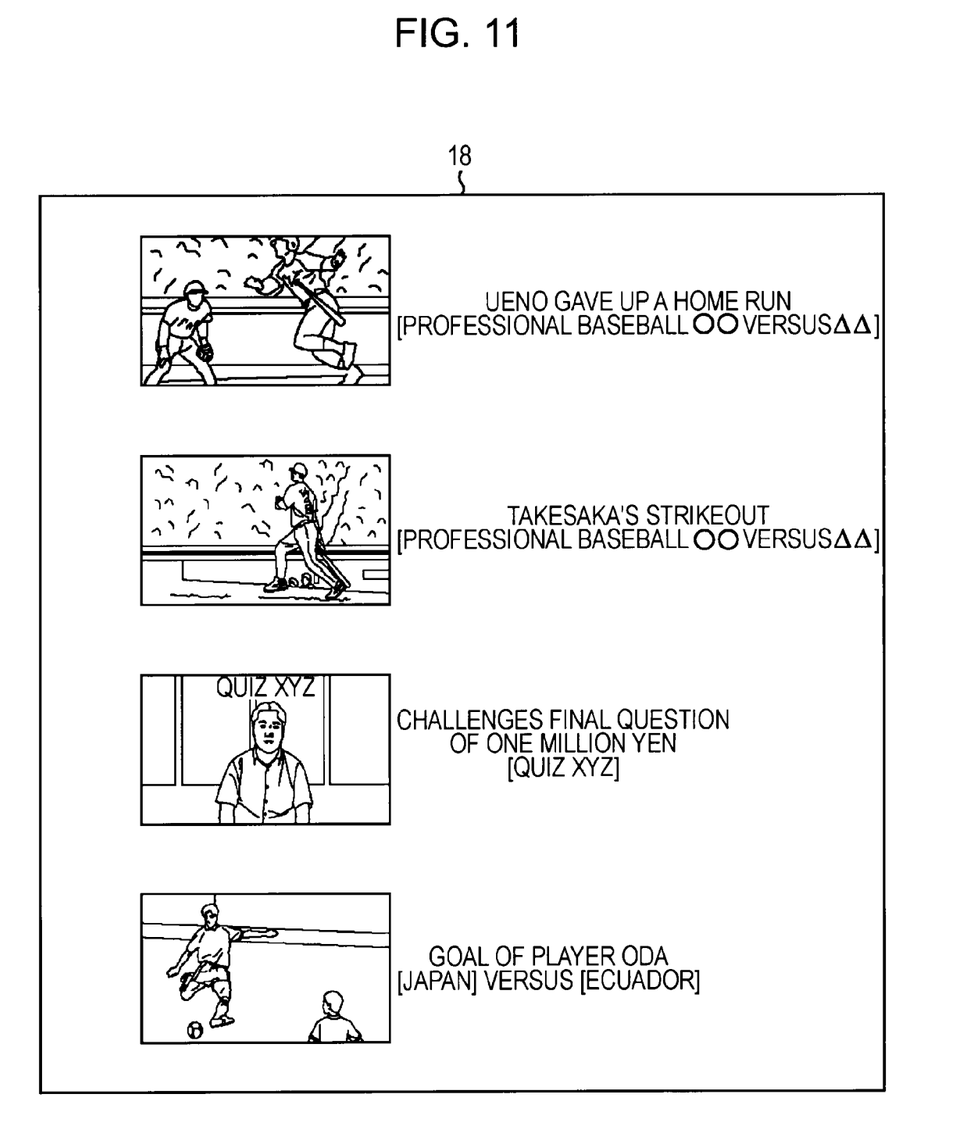
FIG. 11 is a diagram illustrating an example of a display of a menu screen of the recording and playback apparatus 1 of FIG. 8.

In this manner, the predetermined area can be specified together with a remarkable scene. Thus, for example as shown in FIG. 10, for the scene with a bookmark, if an image of the pitcher at that time is specified by the pointer 19A in the example of FIG. 3, as shown in FIG. 11, a comment (for example, "for example, "Ueno gave up a home run") corresponding to that pitcher can be displayed as a bookmark display.

Figure 12:
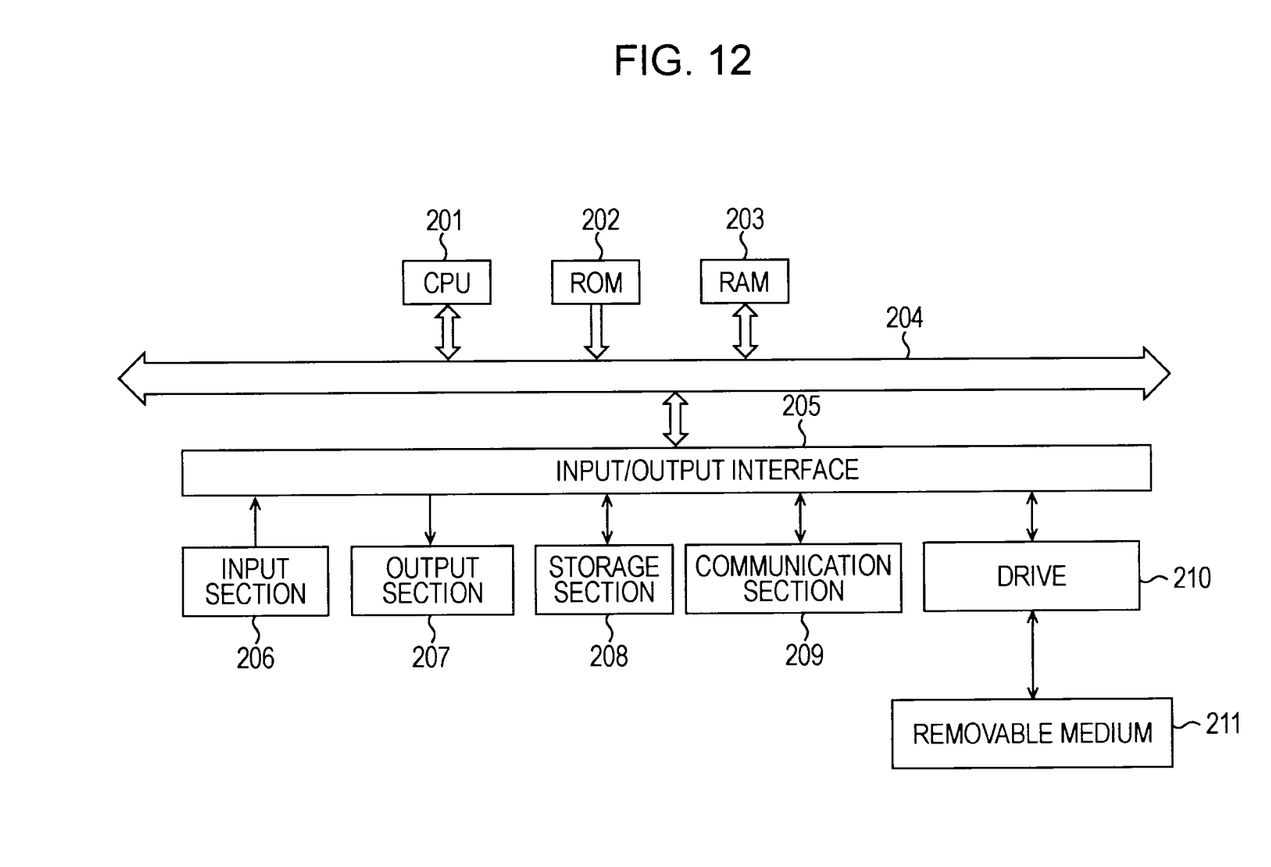
FIG. 12 is a block diagram illustrating an example of a configuration of a personal computer.

FIG. 12 is a block diagram illustrating an example of a configuration of computer hardware performing the above-described series of processing.

In the computer, a CPU (Central Processing Unit) 201, a ROM (Read Only Memory) 202, a RAM (Random Access Memory) 203 are mutually connected by a bus 204.

An input/output interface 205 is also connected to the bus 204. An input section 206 including a keyboard, a mouse, a microphone, etc., an output section 207 including a display, a speaker, etc., a storage section 208 including a hard disk, a nonvolatile memory, etc., a communication section 209 including a network interface, etc., and a drive 210 for driving a removable medium 211, such as a magnetic disk, an optical disc, a magneto-optical disc, or a semiconductor memory, etc., are connected to the input/output interface 205.

In the computer having the configuration as described above, the CPU 201 loads the program stored, for example in storage section 208 to the RAM 203 through the input/output interface 205 and the bus 204 to execute the program, thereby the above-described series of processing is performed.

The program to be executed by the computer (CPU 201) is recorded in a removable medium 211, which is a package medium including, such as a magnetic disk (including a flexible disk), an optical disc (including a CD-ROM (Compact Disc-Read Only Memory), a DVD (Digital Versatile Disc), etc.), a magneto-optical disc, or a semiconductor memory, etc. Alternatively, the program may be provided through wired or wireless transmission, such as a local area network, the Internet, a digital satellite broadcasting, etc.

The program can be installed in the storage section 208 through the input/output interface 205 by attaching the removable medium 211 to the drive 210. Also, the program can be received by the communication section 209 through wired or wireless transmission and be installed in the storage section 208. In addition, the program may be pre-installed in the ROM 202 or the storage section 208 in advance.

In this regard, the program executed by the computer may be the program that is processed in time series in accordance with the described sequence in this specification. Also, the programs may be the programs to be executed in parallel or at necessary timing, such as at the time of being called, or the like.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing apparatus comprising:
   accepting means for accepting a user's input of specification of a remarkable scene during playback processing of a video content to be recorded on a recording medium or a video content already recorded on a recording medium;
   detecting means for detecting scene changes of the video content to be recorded on the recording medium or the video content already recorded on the recording medium;
   setting means for bookmarking a scene corresponding to a timing of accepting the input of specification of the remarkable scene by the accepting means, such that the setting means bookmarks the remarkable scene, which starts at a scene change, of the scene changes detected by the detecting means;
   acquiring means for acquiring additional information for generating a display indicating contents of the remarkable scene using character information, an image, or a combination thereof extracted from the video content;
   storage means for storing the acquired additional information for each bookmarked remarkable scene from the video content together with other additional information for bookmarked remarkable scenes from other video contents, such that the storage means stores a plurality of additional information, wherein each of the plurality of additional information indicates contents of one of a plurality of bookmarked remarkable scenes, and the plurality of bookmarked remarkable scenes are from a plurality of video contents; and display controlling means for controlling generation of the display indicating the contents of the plurality of bookmarked remarkable scenes on the basis of the plurality of additional information stored in the storage means, such that the display includes a listing of the plurality of additional information, wherein each of the plurality of additional information indicates the contents of one of the plurality of bookmarked remarkable scenes, and the plurality of bookmarked remarkable scenes are from the plurality of video contents, wherein the acquiring means includes extracting means for extracting the character information, such that the character information is extracted from the video content based on a position of a cursor input of the user in the user's input of specification of a remarkable scene, such that image data of a portion of a frame of the video content that includes the position is extracted and recognized as including an image of a person, and such that the character information extracted by the extracting means and displayed in the list screen includes a name of the person.

2. The information processing apparatus according to claim 1, wherein the accepting means accepts a separate user's input of specification of a remarkable scene for each of the plurality of bookmarked remarkable scenes included in the list screen.

3. The information processing apparatus according to claim 1, wherein:

the display controlling means generates the display as a user selectable interface, in which a user can select any of the additional information from the listing to cause the apparatus to reproduce the remarkable scene corresponding to the selected additional information.

4. The information processing apparatus according to claim 1, further comprising:

an image division means for selecting a predetermined image area within the remarkable scene and setting an image corresponding to the selected image area as the image of the additional information, wherein the acquiring means extracts the character information of the additional information from the image corresponding to the selected image area.

5. The information processing apparatus according to claim 1, wherein the portion of the frame of the video content that includes the person is used as the image extracted from the video content, which is displayed in the list screen.

6. The information processing apparatus according to claim 1, wherein the each of the plurality of additional information are displayed together at a same time.

7. A method of processing information, comprising the steps of:

accepting a user's input of specification of a remarkable scene during playback processing of a video content to be recorded on a recording medium or a video content already recorded on a recording medium;

detecting a scene change of the video content to be recorded on the recording medium or the video content already recorded on the recording medium;

bookmarking a remarkable scene corresponding to a timing of accepting the input of specification by the step of accepting to a user's remarkable scene, such that the bookmarked remarkable scene starts at a scene change, of the scene changes that have been detected on the video content to be recorded on the recording medium or the video content already recorded on the recording medium;

acquiring additional information for generating a display indicating contents of the remarkable scene using character information, an image, or a combination thereof extracted from the video content;

storing the acquired additional information for each bookmarked remarkable scene from the video content together with other additional information for bookmarked remarkable scenes from other video contents, such that a plurality of additional information are stored, wherein each of the plurality of additional information indicates contents of one of a plurality of bookmarked remarkable scenes, and the plurality of bookmarked remarkable scenes are from a plurality of video contents; and display controlling for generating the display indicating the contents of the plurality of bookmarked remarkable scenes on the basis of the plurality of additional information that is stored, such that the display includes a listing of the plurality of additional information, wherein each of the plurality of additional information indicates the contents of one of the plurality of bookmarked remarkable scenes, and the plurality of bookmarked remarkable scenes are from the plurality of video contents, wherein the acquiring includes extracting the character information, such that the character information is extracted from the video content based on a position of a cursor input of the user in the user's input of specification of a remarkable scene, such that image data of a portion of a frame of the video content that includes the position is extracted and recognized as including an image of a person, and such that the character information extracted in the extracting and displayed in the list screen includes a name of the person.

8. The method of processing information according to claim 7, further comprising:

selecting a predetermined image area within the remarkable scene and setting an image corresponding to the selected image area as the image of the additional information; and extracting the character information of the additional information from the image corresponding to the selected image area.

9. A non-transitory computer-readable storage medium storing a program for causing, when executed by a computer, the computer to perform a method of information processing, the method comprising the steps of:

detecting a scene change of a video content to be recorded on a recording medium or a video content already recorded on the recording medium;

accepting a user's input of specification of a remarkable scene during playback processing of a video content to be recorded on a recording medium or a video content already recorded on a recording medium;

bookmarking a remarkable scene corresponding to a timing of accepting the input of specification by the step of accepting to a user's remarkable scene, such that the bookmarked remarkable scene starts at a scene change, of the scene changes that have been detected on the video content to be recorded on the recording medium or the video content already recorded on the recording medium;

acquiring additional information for generating a display indicating contents of the remarkable scene using character information, an image, or a combination thereof extracted from the video content;

storing the acquired additional information for each bookmarked remarkable scene from the video content together with other additional information for bookmarked remarkable scenes from other video contents, such that a plurality of additional information are stored, wherein each of the plurality of additional information indicates contents of one of a plurality of bookmarked remarkable scenes, and the plurality of bookmarked remarkable scenes are from a plurality of video contents; and display controlling for generating the display indicating the contents of the plurality of bookmarked remarkable scenes on the basis of the plurality of additional information that is stored, such that the display includes a listing of the plurality of additional information, wherein each of the plurality of additional information indicates the contents of one of the plurality of bookmarked remarkable scenes, and the plurality of bookmarked remarkable scenes are from the plurality of video contents, wherein the acquiring includes extracting the character information, such that the character information is extracted from the video content based on a position of a cursor input of the user in the user's input of specification of a remarkable scene, such that image data of a portion of a frame of the video content that includes the position is extracted and recognized as including an image of a person, and such that the character information extracted in the extracting and displayed in the list screen includes a name of the person.

10. The non-transitory computer-readable storage medium of claim 9, the method further comprising:

selecting a predetermined image area within the remarkable scene and setting an image corresponding to the selected image area as the image of the additional information; and extracting the character information of the additional information from the image corresponding to the selected image area.

11. An information processing apparatus comprising:

a storage circuit;

a processor configured to:

detect a scene change of a video content to be recorded on a recording medium or a video content already recorded on the recording medium, accept a user's input of specification of a remarkable scene during playback processing of a video content to be recorded on a recording medium or a video content already recorded on a recording medium, bookmark a scene corresponding to a timing of accepting the input of specification of the remarkable scene by the accepting mechanism, such that the bookmarked scene starts at a scene change, of the scene changes that have been detected on the video content to be recorded on the recording medium or the video content already recorded on the recording medium, acquire additional information for generating a display indicating contents of the remarkable scene using character information, an image, or a combination thereof extracted from the video content, and store in the storage section the acquired additional information for each bookmarked remarkable scene from the video content together with other additional information for bookmarked remarkable scenes from other video contents, such that a plurality of additional information are stored, wherein each of the plurality of additional information indicates contents of one of a plurality of bookmarked remarkable scenes, and the plurality of bookmarked remarkable scenes are from a plurality of video contents; and a display controlling circuit configured to control generation of the display indicating the contents of the plurality of bookmarked remarkable scenes on the basis of the additional information that is stored, the display including a list of the plurality of additional information, wherein each of the plurality of additional information indicates the contents of one of the plurality of bookmarked remarkable scenes, and the plurality of bookmarked remarkable scenes are from the plurality of video contents, wherein the processor is configured to acquire the additional information by extracting the character information, such that the character information is extracted from the video content based on a position of a cursor input of the user in the user's input of specification of a remarkable scene, such that image data of a portion of a frame of the video content that includes the position is extracted and recognized as including an image of a person, and such that the character information extracted in the extracting and displayed in the list screen includes a name of the person.

12. The information processing apparatus of claim 11, the processor further configured to:

select a predetermined image area within the remarkable scene and to set an image corresponding to the selected image area as the image of the additional information; and extract the character information of the additional information from the image corresponding to the selected image area.

* * * * *